Figure 5:
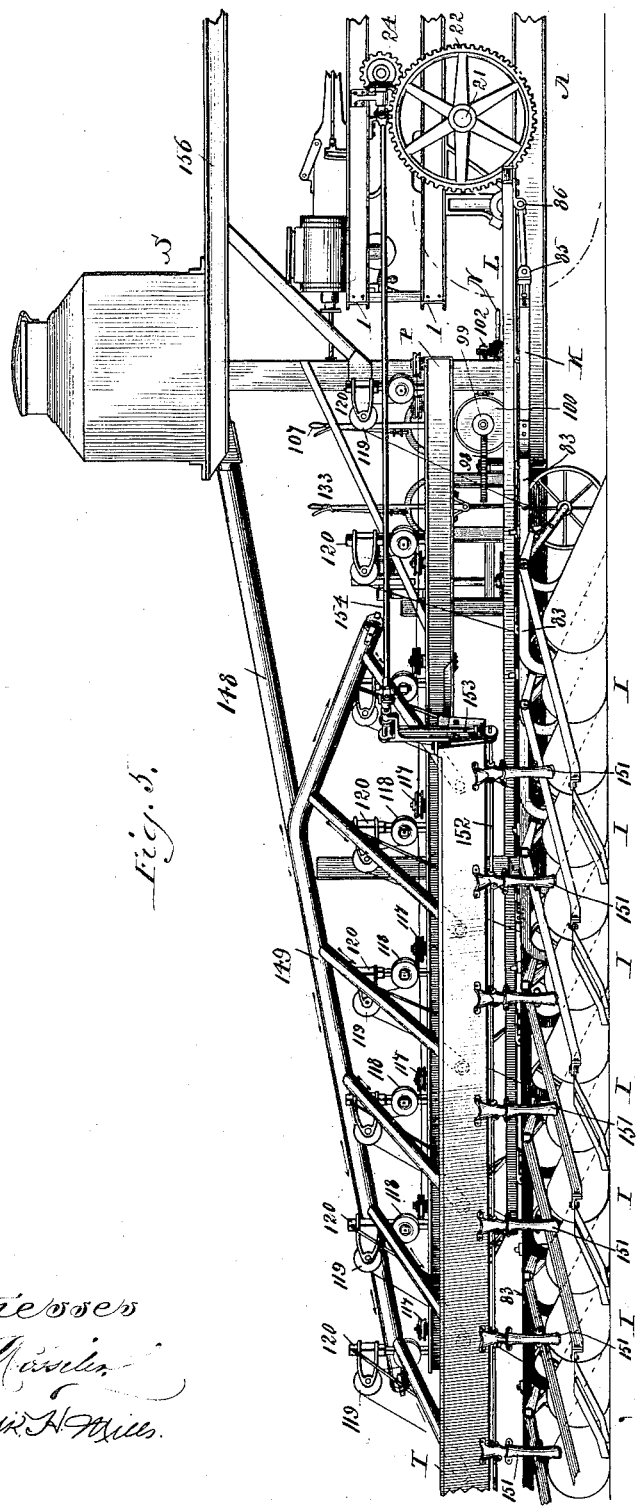

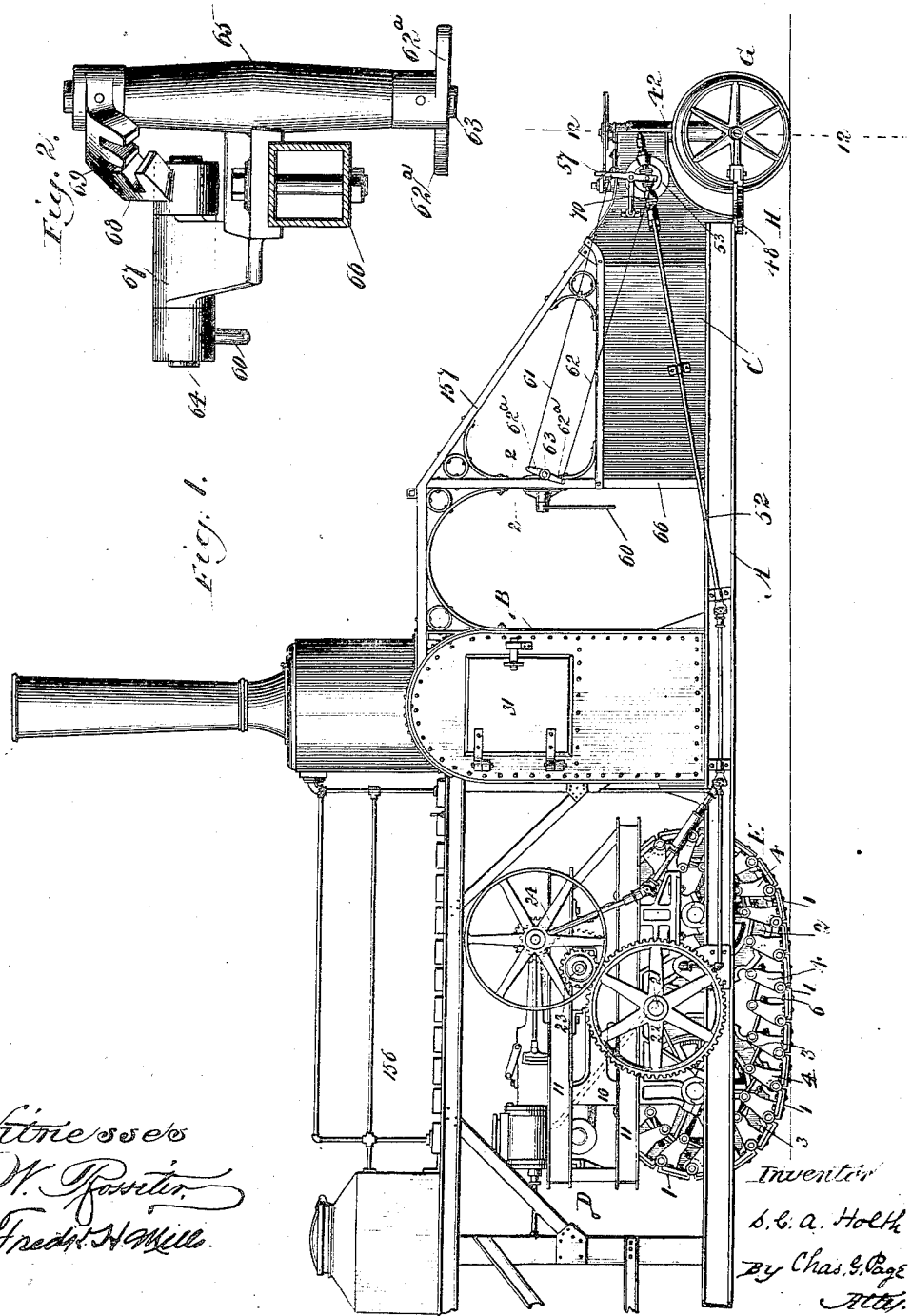

(No Model.)
S. C. A. HOLTH.
TRACTOR.
No. 437,759.
18 Sheets—Sheet 2.
Patented Oct. 7, 1890.
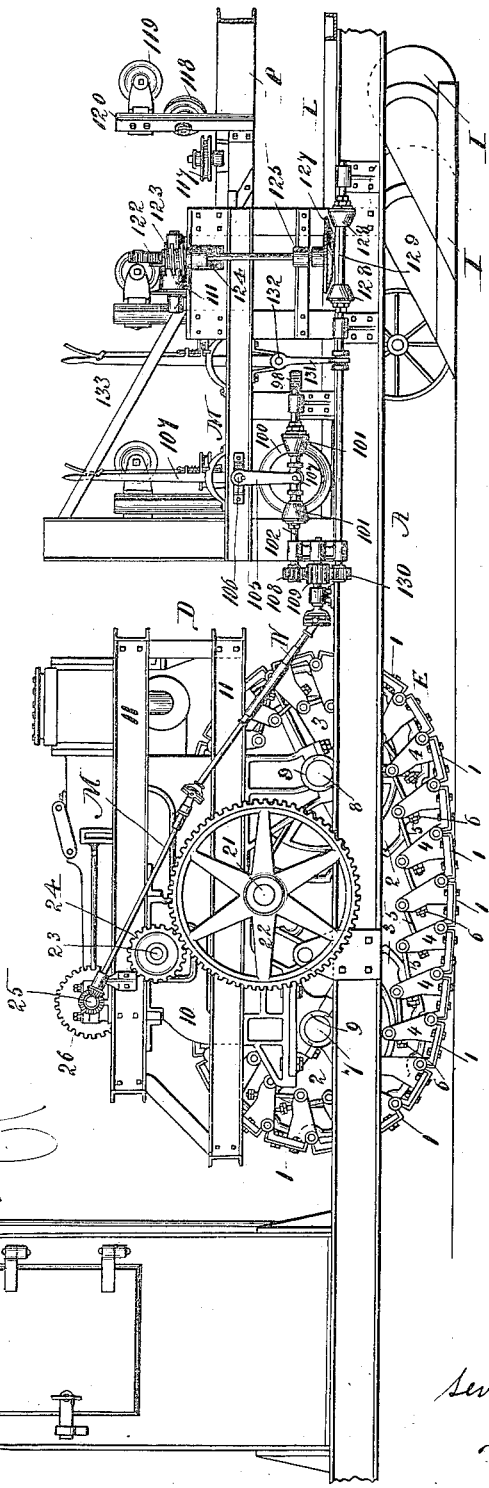

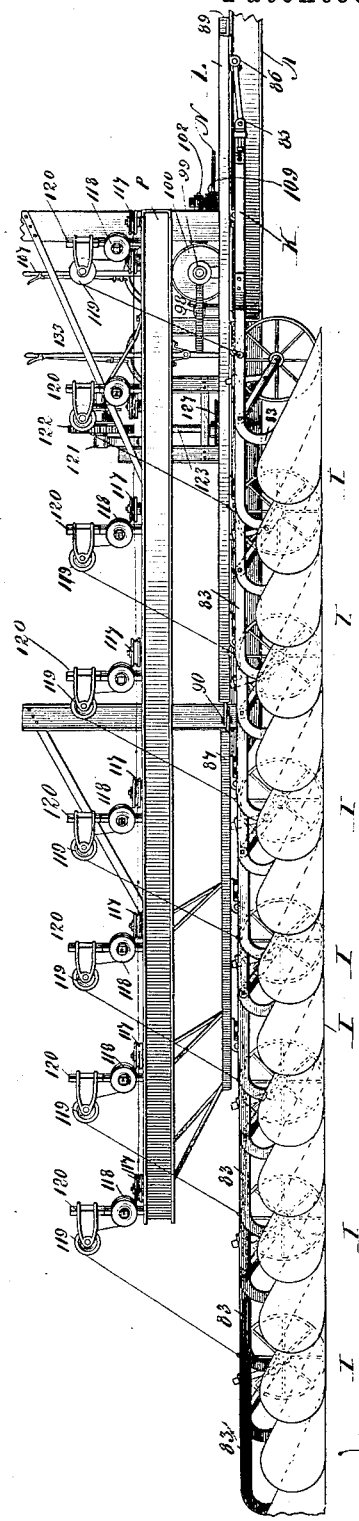

(No Model.) 18 Sheets—Sheet 4.

S. C. A. HOLTH.
TRACTOR.

No. 437,759. Patented Oct. 7, 1890.

Witnesses
W. Hässler
Fredk H. Mills

Inventor
S. C. A. Holth
By Chas. G. Page
Atty.

(No Model.)   S. C. A. HOLTH.   18 Sheets—Sheet 7.
TRACTOR.

No. 437,759.   Patented Oct. 7, 1890.

(No Model.) 18 Sheets—Sheet 8.
S. C. A. HOLTH.
TRACTOR.
No. 437,759. Patented Oct. 7, 1890.
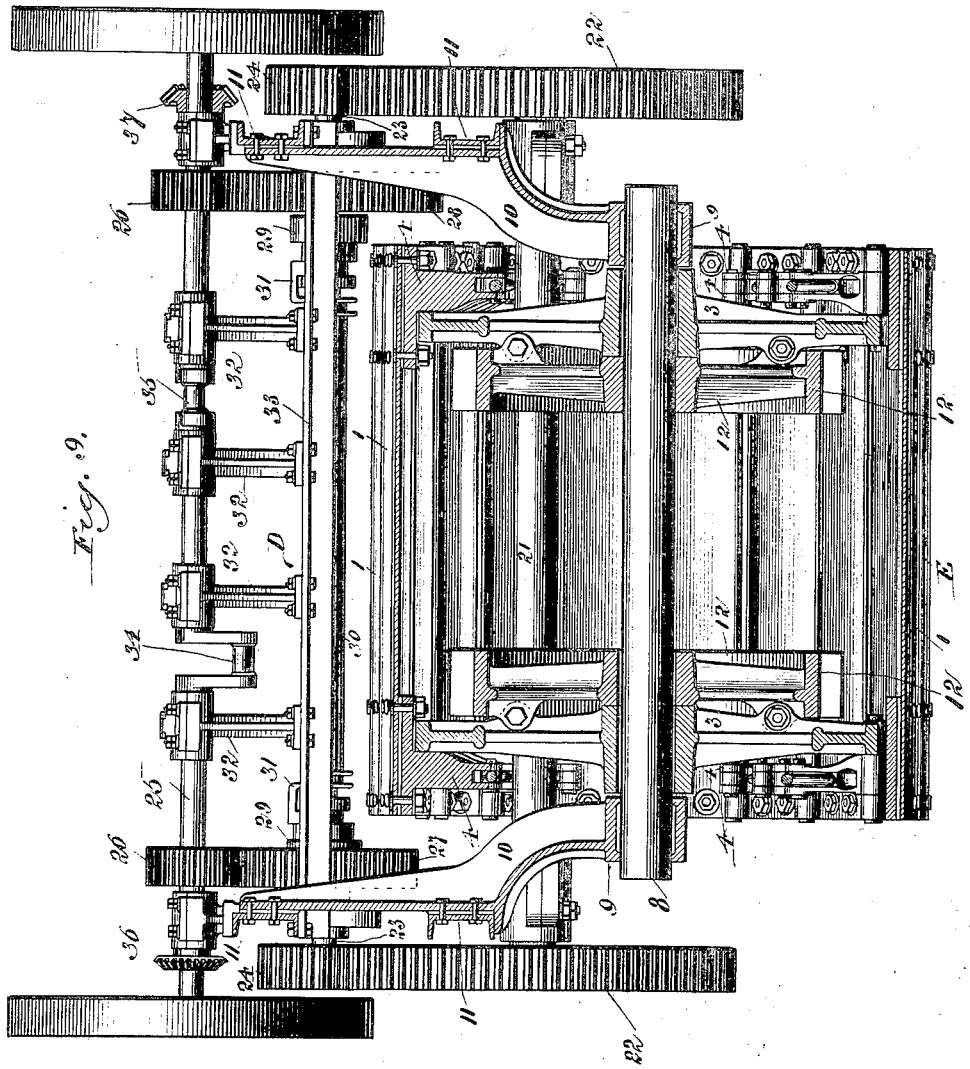
Witnesses
W. Prouter
Fredk H. Mill.
Inventor
Severin C. A. Holth
By Chas. G. Page
Atty.

(No Model.) 18 Sheets—Sheet 9.
S. C. A. HOLTH.
TRACTOR.
No. 437,759. Patented Oct. 7, 1890.
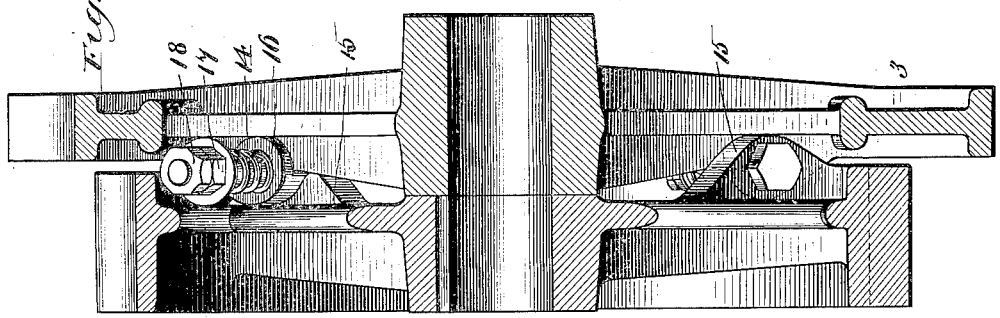
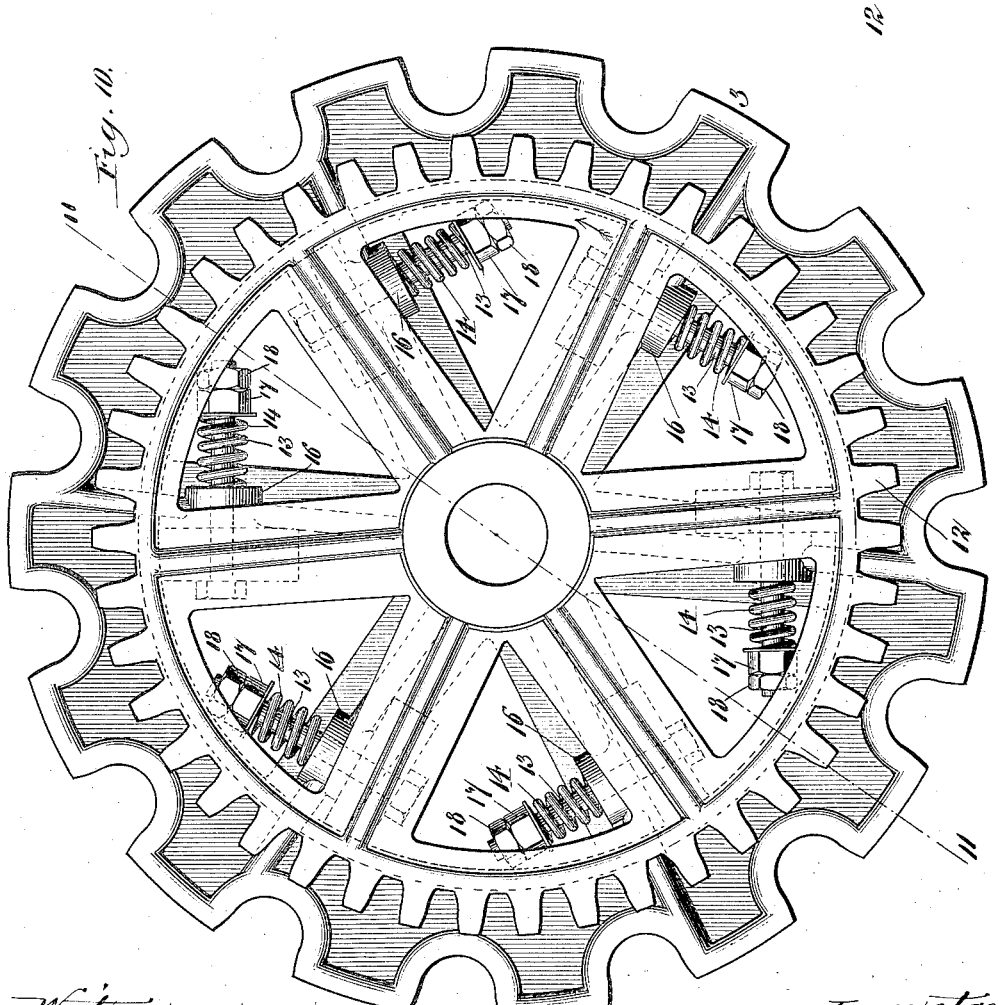
Witnesses
W. Rossiter
Fredk. H. Mills
Inventor
Severin C. A. Holth
By Chas. G. Page
Atty.

(No Model.)  18 Sheets—Sheet 10.
S. C. A. HOLTH.
TRACTOR.
No. 437,759.  Patented Oct. 7, 1890.
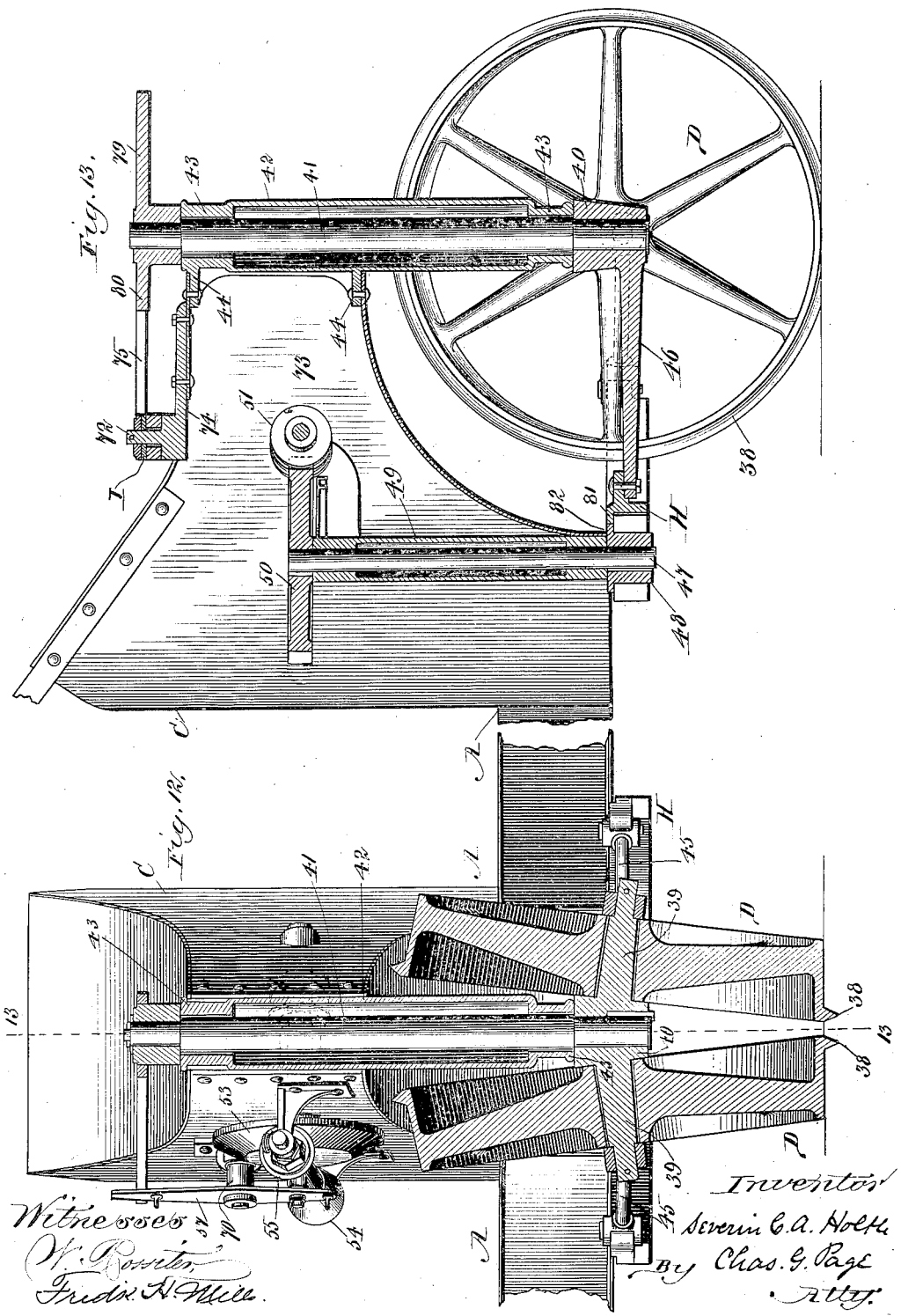

(No Model.)                     S. C. A. HOLTH.                    18 Sheets—Sheet 11.
                                    TRACTOR.
No. 437,759.                                              Patented Oct. 7, 1890.

Witnesses                                                  Inventor
                                                           Severin C. A. Holth
                                                           By Chas. G. Page
                                                              Atty.

(No Model.) 18 Sheets—Sheet 12.
S. C. A. HOLTH.
TRACTOR.
No. 437,759. Patented Oct. 7, 1890.
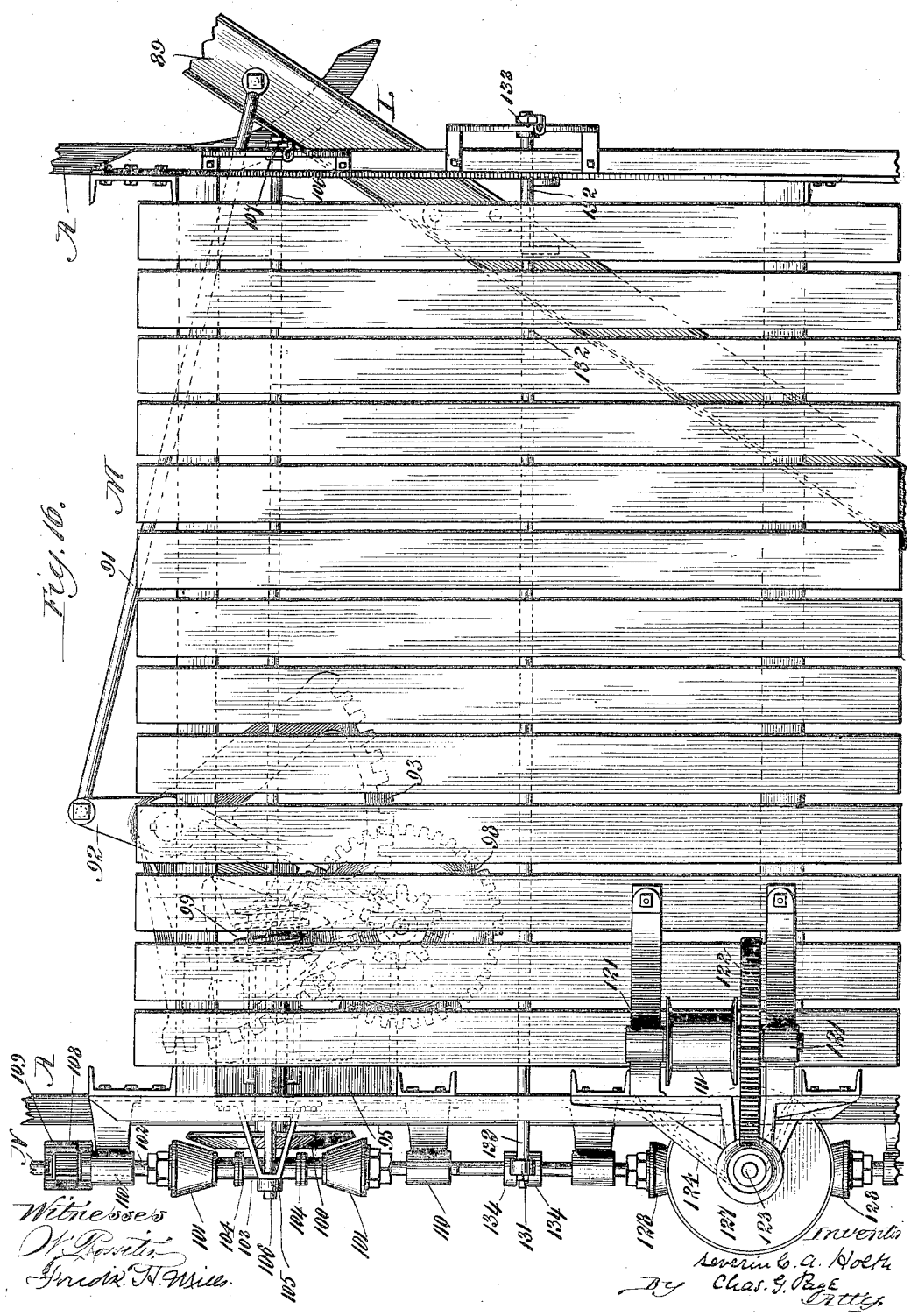

(No Model.) 18 Sheets—Sheet 13.
S. C. A. HOLTH.
TRACTOR.
No. 437,759. Patented Oct. 7, 1890.
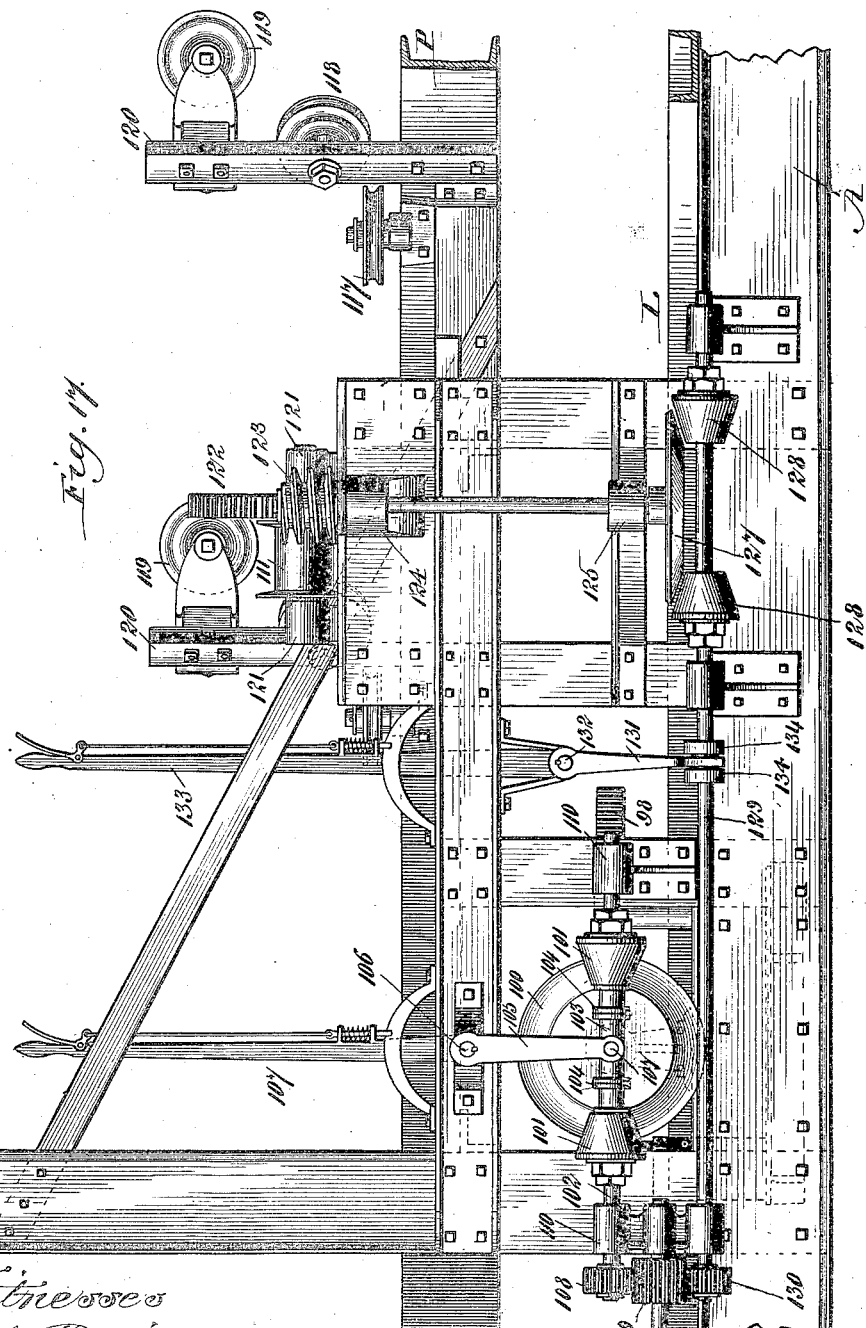

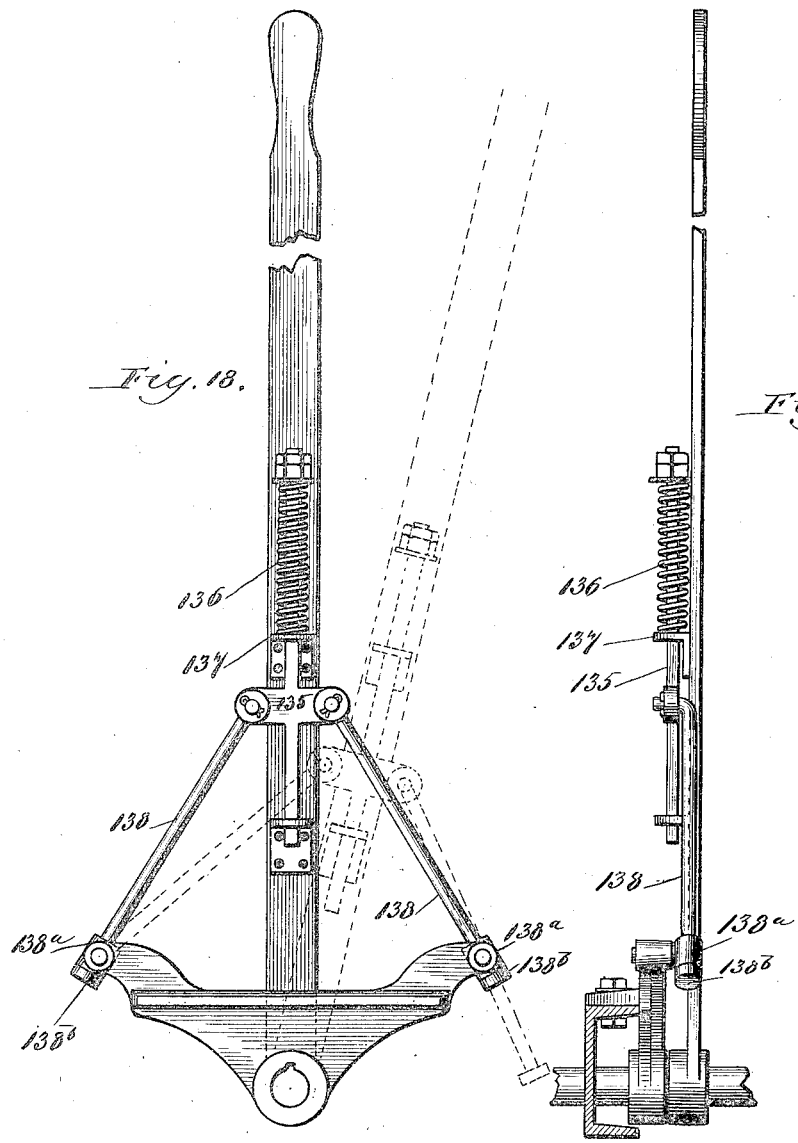

(No Model.)  
S. C. A. HOLTH.  
TRACTOR.  
No. 437,759. Patented Oct. 7, 1890.
18 Sheets—Sheet 15.
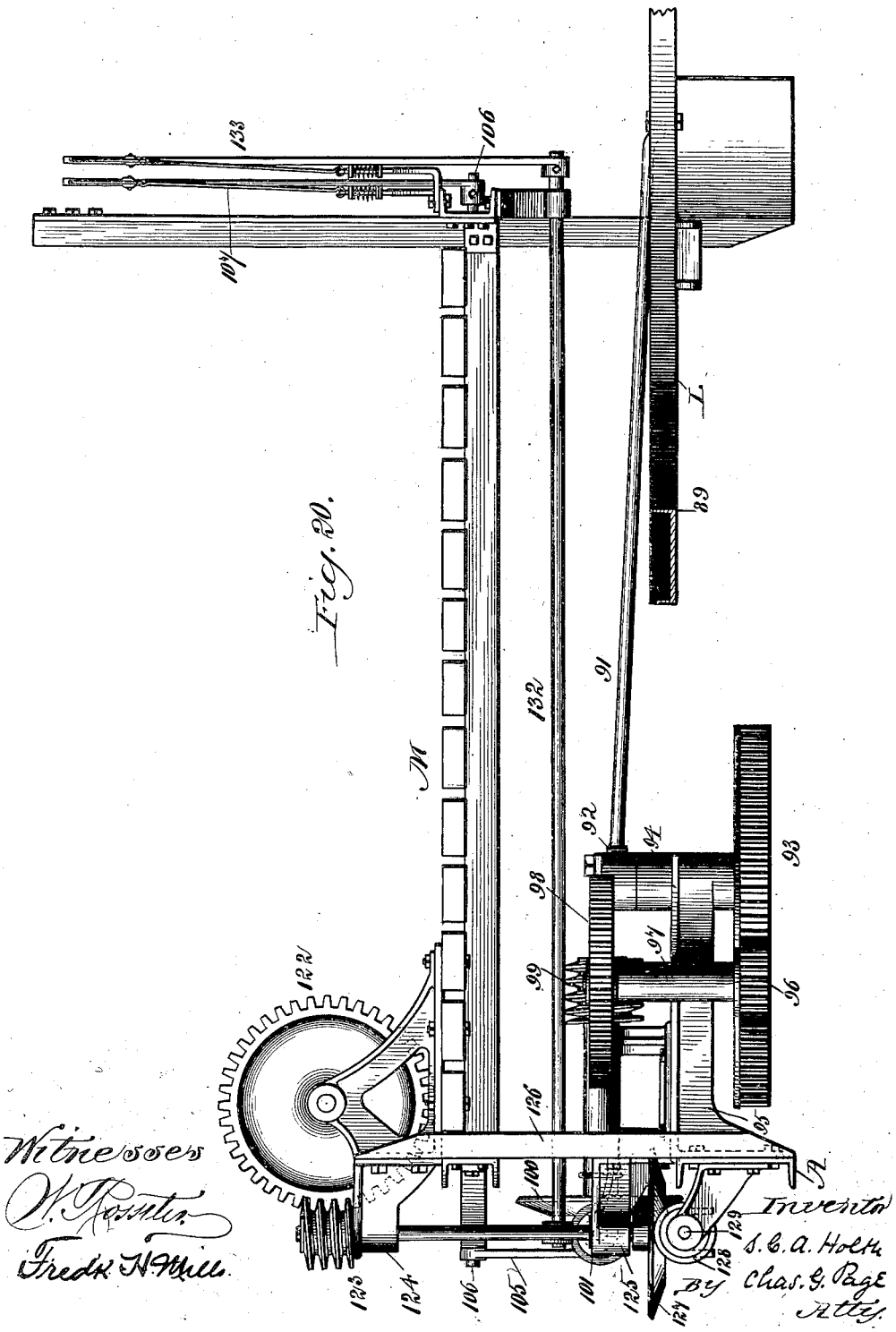

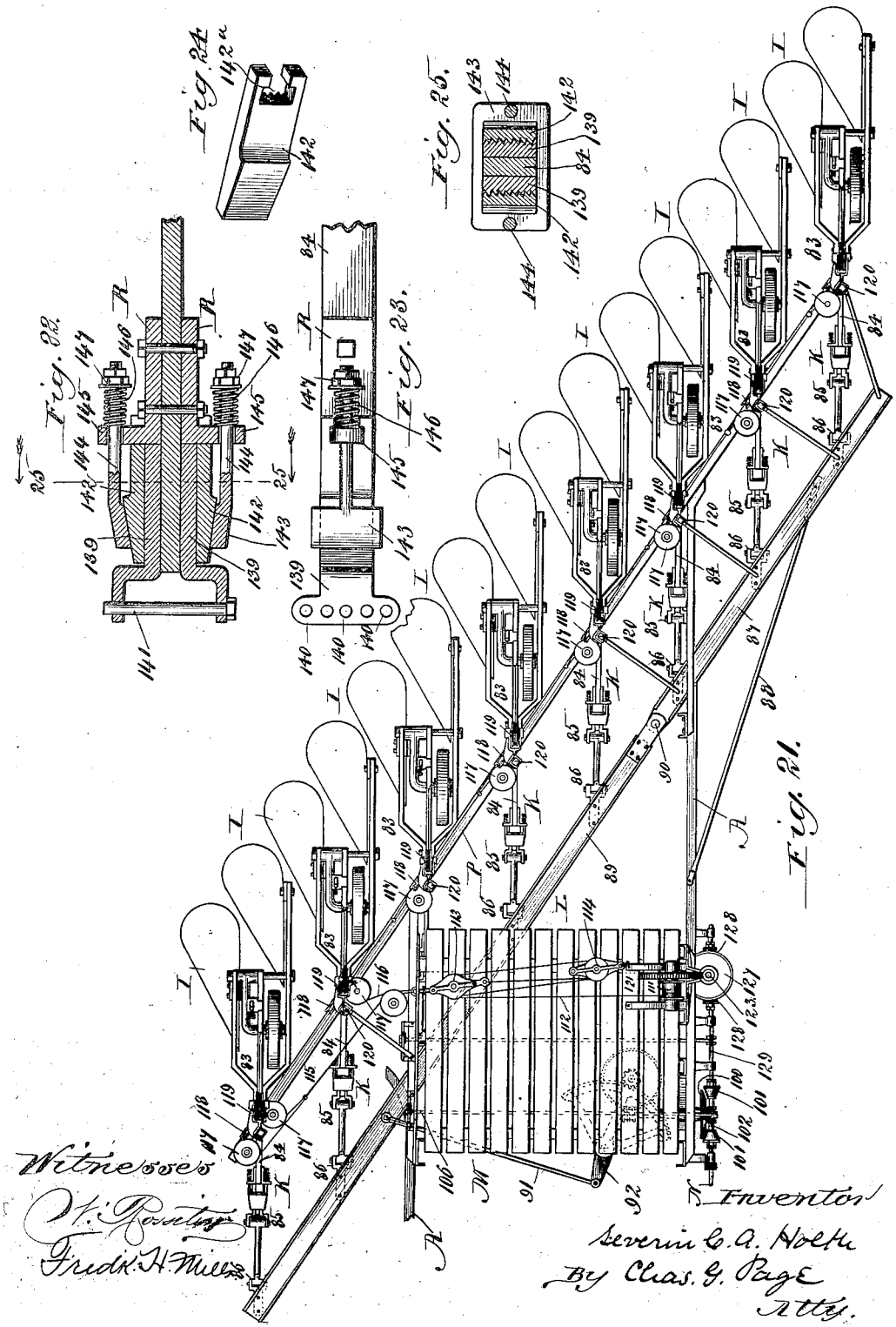

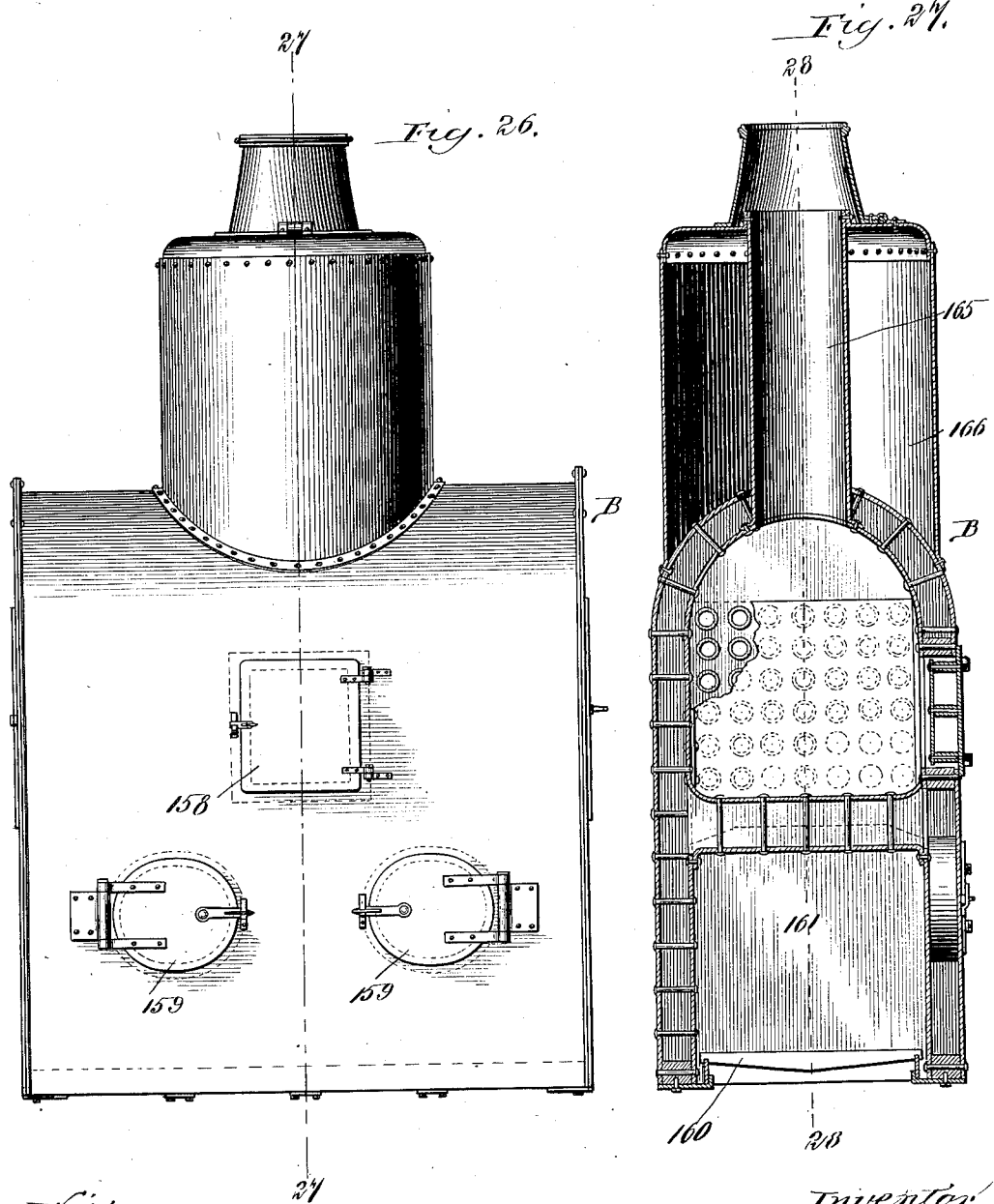

(No Model.) 18 Sheets—Sheet 18.

S. C. A. HOLTH.
TRACTOR.

No. 437,759. Patented Oct. 7, 1890.

UNITED STATES PATENT OFFICE.

SEVERIN C. A. HOLTH, OF CHICAGO, ILLINOIS, ASSIGNOR TO JOHN A. GARDNER, OF SAME PLACE.

TRACTOR.

SPECIFICATION forming part of Letters Patent No. 437,759, dated October 7, 1890.

Application filed July 6, 1889. Serial No. 316,667. (No model.)

*To all whom it may concern:*

Be it known that I, SEVERIN C. A. HOLTH, a citizen of the United States, residing at Chicago, in the county of Cook and State of Illinois, have invented a certain new and useful Improvement in Tractors, of which the following is a specification.

The object of my invention, generally stated, is to successfully utilize steam-power in plowing, seeding, and generally cultivating the soil, and to perform any or all of such operations upon so large a scale that the great rapidity with which the work can be done shall not only more than compensate for the cost of the power and machinery employed, but also render such work exceedingly economical.

The general plan of the machine herein involved may be stated as follows: The machine involves one or more steering-wheels at the front, a gang of plows at the rear, and a tractor or traction device arranged about midway of the length of the machine and comprising a wheeled engine-truck, which is jointed to the main frame of the machine, and an endless slatted belt or track which passes about the truck-wheels, and which is so operated therefrom that during operation the truck-wheels will roll upon the endless slatted track and thereby be prevented from sinking into the ground. The engine is carried by the engine-truck and provided with a rotary driving-shaft, which is gear-connected with one or more, but preferably with two, of the truck-wheels, and the boiler-furnace and boiler are arranged upon the main frame just in front of the engine-truck. Pipe-connection is made between the engine and the boiler, and pipe-connection is also made between the boiler and the water-tank, which latter is arranged within the space that is bounded by the endless slatted track. Standing space is provided in front of the boiler-furnace and boiler for the engineer, who may from such position control both the engine and a steering mechanism which is operated from the engine. Power for steering is derived from a jointed rotary shaft that is driven from the engine. Connection between said rotary jointed shaft and the steering mechanism can be established or broken at the will of the engineer. Means are also provided whereby in case the steam-actuated steering mechanism should tend to swing the steering wheel or wheels too far to the right or to the left the connection between the jointed rotary driving-shaft and the steering mechanism will be automatically broken. The plows are arranged in a gang or series which extends obliquely to the length of the machine, and the plow-beams are so attached to the main frame that the plows can be raised and lowered. A mechanism for raising and lowering the plows is arranged upon the main frame and operated from the engine through the medium of a jointed rotary power-transmitting shaft. This shaft can at the will of an attendant on the machine be connected with and disconnected from the plow raising and lowering mechanism. Provision is also made for adjusting the plows, and to such end a plow-adjusting mechanism can, at the will of said attendant, be connected with and disconnected from the rotary jointed power-transmitting shaft that is employed for actuating the plow-raising mechanism. The plows are severally held so that in the event of any one or more of the plows meeting an impassable obstruction the plow or plows thus meeting with the resistance will simply drop out of connection with the machine and thereby avoid breakage of parts. The machine is also provided with seeding devices and harrows, so that when desired it can be made to both plow and seed.

Certain details serving to increase the general efficiency of the machine are hereinafter particularly described.

In the accompanying drawings the full length of the machine is not shown in any one view, for the reason that to so represent it would involve representation upon an inconveniently-small scale.

Figure 6:
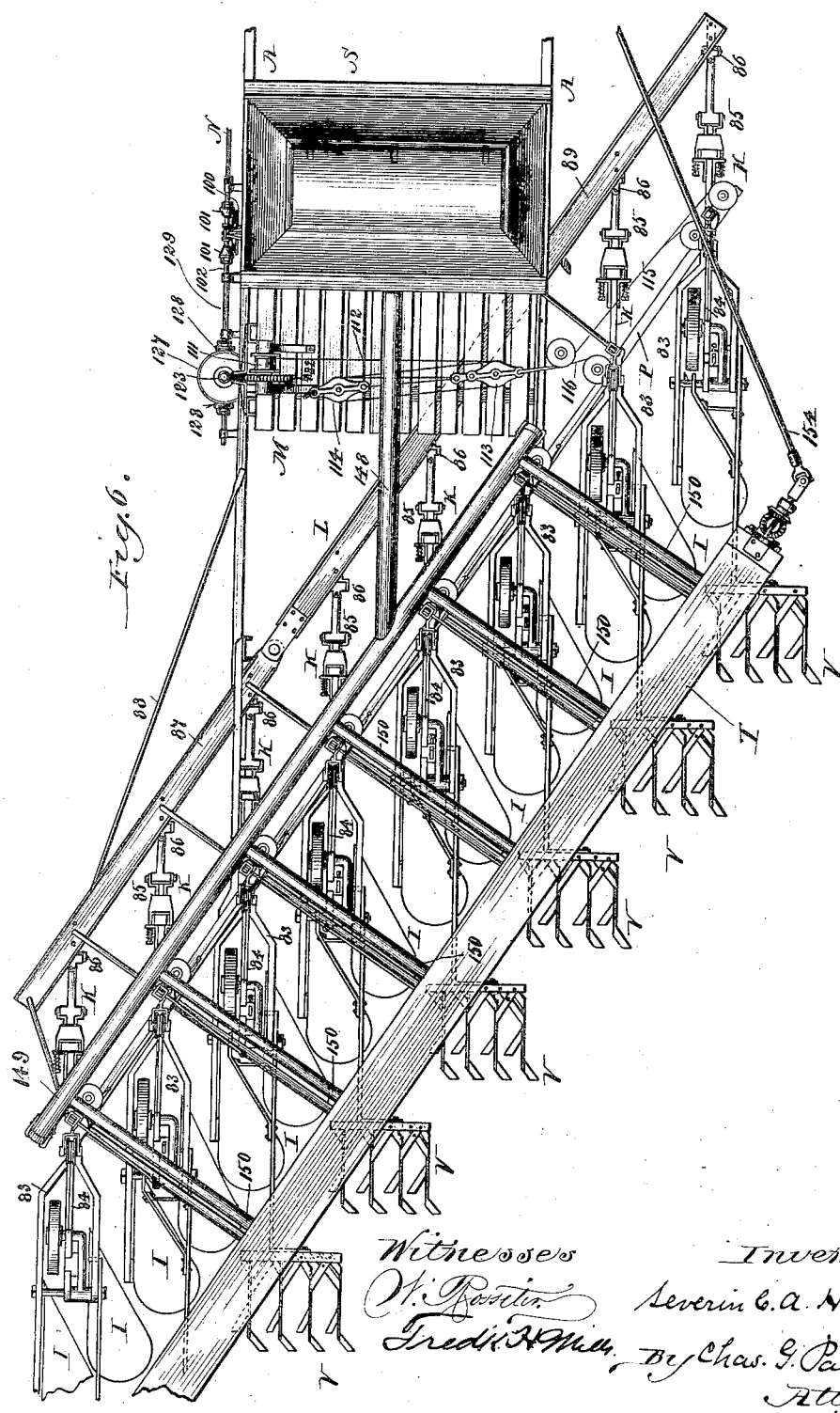
Figure 7:
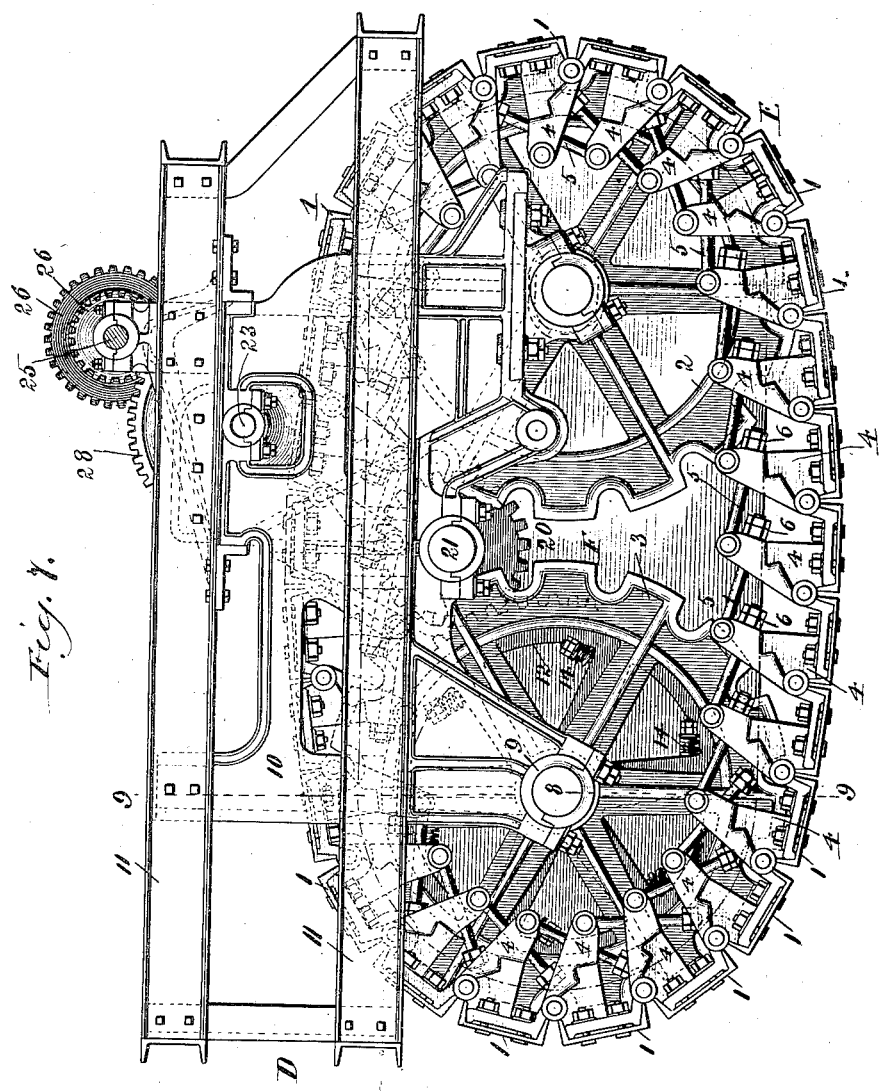
Figure 8:
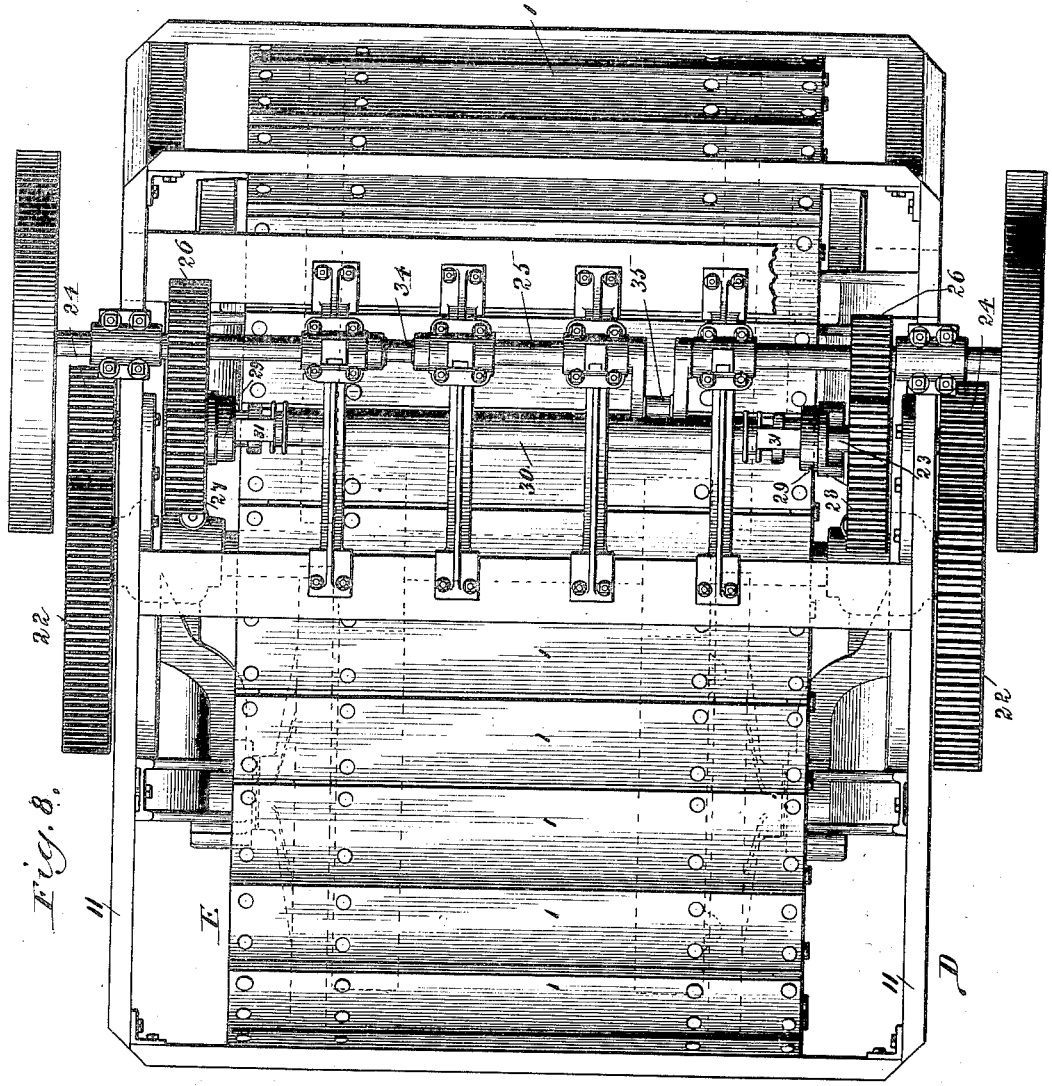
Figure 14:
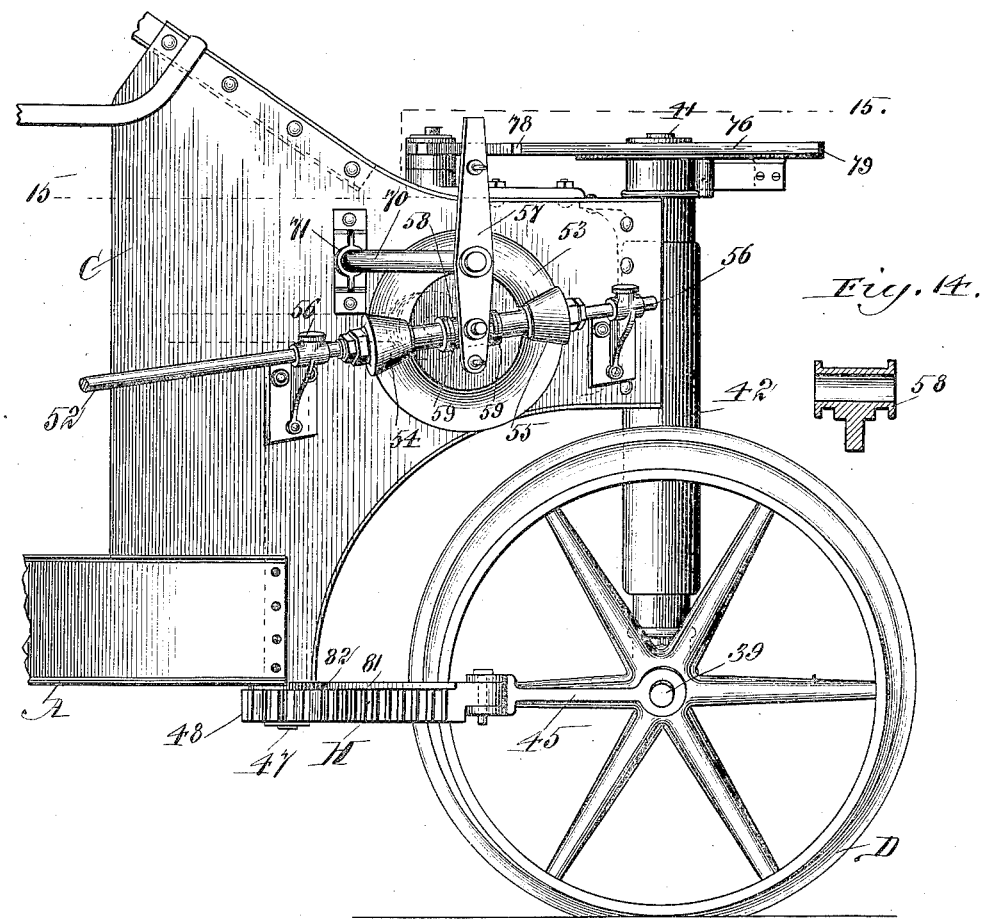
Figure 15:
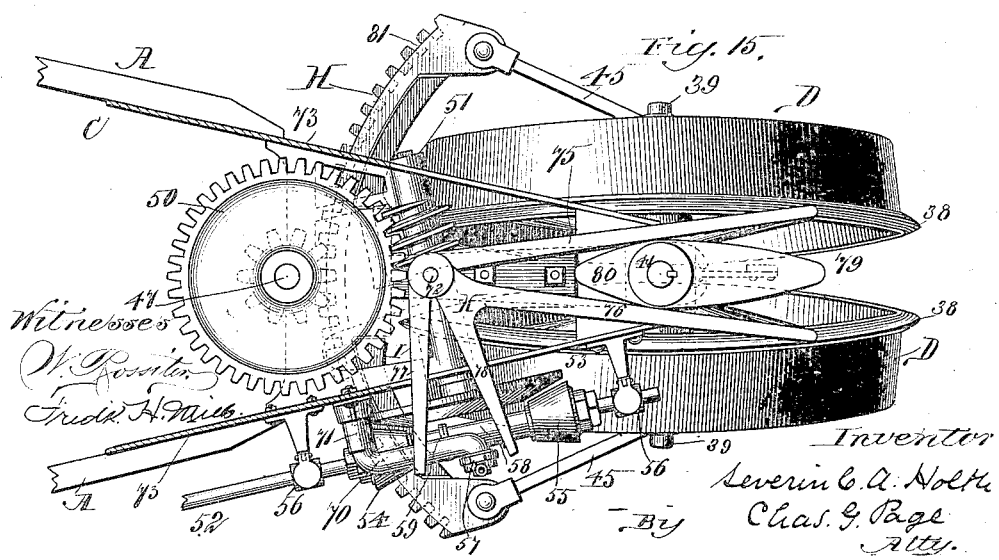
Figure 28:
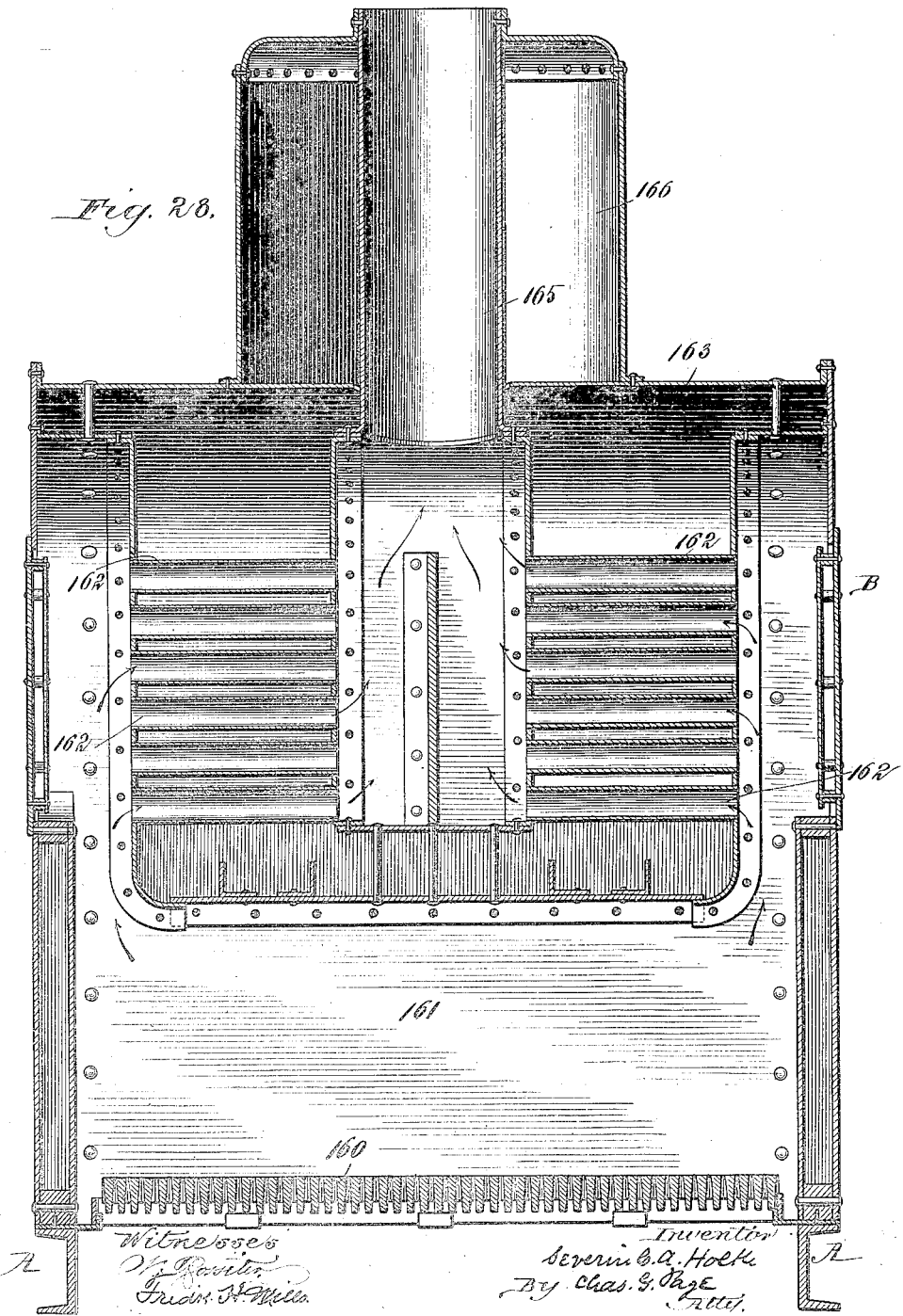

In said drawings, Figure 1 is a side elevation of a part of the machine, including the middle and forward portions thereof. Fig. 2 represents a section taken horizontally through the port or standard 66 on line 2 2 in Fig. 1, and shows in top plan a portion of the device by which an attendant standing in front of the boiler-furnace B can control the steering mechanism. Fig. 3 is a side elevation including the middle and greater part of the rear portion of the machine, the side represented being the opposite of the side shown in Fig. 1. Fig. 4 is a side elevation including the plows and plow-lifting mechanism, the seeding devices and harrows being for convenience of illustration omitted from this representation of the rear portion of the machine. Fig. 5 is a view similar to Fig. 4, but includes the seeding devices and a part of the traction-propelling portion of the machine. Fig. 6 is a top plan of Fig. 5. Fig. 7 represents in side elevation and on a larger scale the engine-truck and endless trussed track whereon the engine-truck wheels are arranged to roll, the side shown being that represented in Fig. 1. For convenience of illustration the wheels 22 and 24 represented in Fig. 1 are omitted from Fig. 7, the balance or fly wheels being also omitted from the engine-shaft 25. Fig. 8 is a top plan of Fig. 7, the wheels omitted in Fig. 7 being, however, present in Fig. 8. Fig. 9 represents a cross-section taken through the machine on line 9 9 in Fig. 7. Fig. 10 represents on an enlarged scale one of the engine-truck wheels and a spur-wheel connected therewith. Fig. 11 is a section on line 11 11 in Fig. 10. Fig. 12 represents on an enlarged scale a cross-section through Fig. 1 on line 12 12 and includes the steering-wheels and steering mechanism. Fig. 13 represents a vertical section through the forward steering portion of the machine shown in Fig. 12, the section being on line 13 13 in Fig. 12. Fig. 14 represents in side elevation the forward end portion of the machine, including the steering-wheels and steering mechanism. Fig. 15 is a sectional plan of Fig. 14, the section being on line 15 15. Fig. 16 represents a top plan view of the rear platform L and a portion of the plow-raising and plow-adjusting mechanisms. Fig. 17 is a side elevation of Fig. 16 looking from a point at the left of said figure. Figs. 18 and 19 represent side and edge views of one of the hand-levers of Fig. 17, with means for returning the lever to its normally-upright position. Fig. 20 is a side elevation of Fig. 16. Fig. 21 represents, on a smaller scale than Figs. 16, 17, and 20, a top plan view of the platform M, the plows, and mechanisms for controlling the plows. Fig. 22 is a longitudinal central section through one of the joints in one of the plow-beams. Fig. 23 is a plan of said jointed portion of a plow-beam. Fig. 24 represents in perspective one of the plates of said joint. Fig. 25 is a cross-section through the joint on line 25 25 in Fig. 22. Fig. 26 is an elevation of the boiler-furnace. Figs. 27 and 28 are sectional views of the same.

The main frame of the machine comprises in its structure the long channel-iron side bars A, which are understood to be suitably connected by cross bars or braces. The boiler-furnace B is arranged upon the main frame at a suitable distance back from the forward end of the machine, while the coal box or receptacle C is also arranged upon the main frame at the forward end portion thereof and at a distance in front of the boiler-furnace, so as to provide between the two a desirable width of standing room for the engineer, who may thereby have ready access to both the boiler-furnace and the coal-box, and at the same time be in position to see ahead and regulate the steering of the machine.

The engine-truck or engine-frame D is constructed independently of the main frame, but has a jointed connection therewith, so that the entire traction-propelling device may rock independently of the main frame.

The traction-propelling device comprises an engine, which is arranged upon the engine frame or truck, and an endless slatted belt E, which passes about the engine-truck wheels, so as to provide a track for the same. The "endless slatted belt" or "traveler," as it may be termed, consists of a set of slats 1, which are hinged together in endless series and provided upon their inner sides in any suitable way with cogs or teeth, with which the truck-wheels may engage and thereby prevent slipping, two forward truck-wheels 2 and the two rear truck-wheels 3 being herein provided with peripherally-arranged notches adapted to receive cogs which are arranged upon the slatted track or traveler. The endless slatted track is provided along its inner side with a couple of endless jointed folding trusses, each formed by braces 4, (see Fig. 7,) which are secured upon the slats and connected together by chord links or rods 5. Each truss link or rod 5 has a hinge-connection with one brace and a sliding connection with the next succeeding brace. Said truss-rods are also provided with adjustable stops 6, formed by nuts arranged upon the terminal portions of their free or unhinged ends, whereby the extent to which the truss may unfold can be determined by the adjustment of said stops. The folding of the two trusses along such portions of the track as are passing about the wheels is permitted by reason of the aforesaid sliding connections of the rods with the braces, while, on the other hand, the unfolding of each truss along the upper and lower leaves of the endless slatted track, which extend between the front and rear wheels, will be arrested at the point where such portions of the endless track are in a straightened condition.

The axles 7 and 8, respectively, for the forward and rear wheels 2 and 3 are journaled in boxes 9 on the engine-truck frame, a desirable mode of connecting said boxes with the truck-frame being illustrated in Fig. 9, wherein a pair of boxes 9 for the rear axle 8 are provided at the lower ends of the vertically-arranged flanged side pieces 10, which latter rigidly connect and brace the upper and lower horizontal channel-iron side bars 11 of the truck-frame. One of each pair of sprocket-wheels, which constitute the engine-truck wheels, is arranged loose upon its allotted axle, while the remaining two wheels are preferably rigid upon the axles, the object of such arrangement being to avoid cramping during operation.

The rear axle carries a couple of spur-wheels 12, which are loose thereon and respectively arranged alongside one and the other of the two wheels 3, as illustrated in Figs. 7, 9, 10, and 11. As a means for so connecting the spur-wheels with the rear engine-truck wheels as to permit a certain extent of yield in the connections in the event of meeting obstructions during the travel of the machine, each spur-wheel carries a set of bolts 13, Figs. 10 and 11, which have sliding connections with the adjacent engine-truck wheel, and which are subject to the action of springs 14, arranged to interpose spring resistances to the forward movement of the spur-wheels independently of their allotted engine-truck wheels. As a simple and durable arrangement, the said bolts at their headed ends engage lips or flanges 15, Fig. 11, on the spur-wheels and extend through holes in bosses 16 on the engine-truck wheels. The bolts extend beyond said bosses and pass through the springs, which latter are arranged between the bosses 16 and nuts 17, that are held upon ends of the bolts. The nuts can be adjusted upon the bolts, and are held against turning by lock-nuts 18. By such arrangement spring resistances are provided as connections between the driving spur-wheels 12 and the wheels 3, which are driven therefrom, and hence danger of breakage during operation is avoided. The spur-wheels may be driven as sprockets from a rotary engine-shaft by means of chain-link belts; but I prefer to employ gearing for such purpose. As a connection between the spur-wheels and said engine-shaft, the spur-wheels are engaged and driven by pinions 20 on a rotary shaft 21, one of said pinions being shown in Fig. 7. The rotary shaft 21 is provided with a couple of gear-wheels 22, respectively secured to one and the other of its ends, (see particularly Figs. 7 and 9,) and is driven from a rotary shaft 23, which is provided at its ends with smaller cogs or gears 24, arranged to engage the comparatively large cogs or gear-wheels 22. The shaft 23 can be driven from the rotary engine-shaft through the medium of either of two intervening gear connections, which are respectively adapted for driving the shaft 23 at different rates of speed, and to such end the rotary engine-shaft 25 is provided with a couple of driving-cogs 26, arranged to respectively engage gears 27 and 28, which are loosely mounted upon the shaft 23. In connection with the loose gears 27 and 28 a clutch device is employed, so that either one of said gears can be temporarily held in rigid connection with the shaft whereon they are mounted. The gears 27 and 28 are respectively of different sizes, the gear 28 being herein shown as the larger of the two.

It is understood that for the general purposes of my invention any suitable construction of clutch device can be employed in conjunction with the loose gears 27 and 28; but as a simple and preferred expedient I feather upon the shaft a couple of sliding clutch-glands 29, respectively arranged for engagement with clutch-glands or clutch-faces on one or the other of the gears 27 and 28, and as a means for simultaneously shifting the sliding clutch-glands the shaft 23 extends through a non-rotative but longitudinally-movable sleeve 30, which connects with the sliding clutch-glands, and which can be shifted endwise either way by any suitably-arranged hand-lever. The sliding clutch-glands of course revolve with the shaft 23, and hence the shifting-sleeve 30 is so connected with the clutch-glands as to permit them to revolve independently of the sleeve, the mode of connection herein illustrated being to provide the sleeve at its ends with hook-shaped pieces 31, which engage in annular grooves in the clutch-glands.

The rotary engine-shaft 25 is mounted in bearings arranged upon the stands 32, Fig. 9, which rise from the engine-truck frame, (for example, from a cross-bar 33 thereof,) and said engine-shaft is provided with a couple of cranks 34 and 35, respectively for the pitmen or connecting-rods of a high-pressure and a low-pressure engine, the crank 34 being herein allotted to the pitman or connecting-rod of a high-pressure engine, while the crank 35 is allotted to the pitman or connecting-rod of a low-pressure engine. Any suitable construction of horizontal or other type of engine can be employed, and hence special illustration and description thereof are not necessary.

The pivotal or rocking joints between the engine-truck frame D and the main frame of the machine are desirably at points forward of the longitudinal middle of the engine-truck, so as to avoid lifting the front part of the engine-truck frame during travel. The steam-pipe from the boiler to the engine can pass through one of said joints, and a water-pipe from the water-tank F to the boiler can pass through the opposite joint, it being observed that said water-tank is arranged within the space that is bounded by the endless traveler and is supported upon the front and rear axles of the engine-truck wheels 2 and 3. The rotary engine-shaft 25 is also provided with a couple of gears 36 and 37, Fig. 9, one of which is employed for actuating a forwardly-extending power-transmitting device to which the steering mechanism is subject, while the other is employed for actuating a rearwardly-extending power-transmitting device from which the plow-lifting and plow-steering mechanisms can be operated.

The main frame of the machine is at its forward end supported by a pair of steering-wheels G, Figs. 1, 12, 13, 14, and 15, which are arranged upon a swiveled axle. These steering-wheels are made cone-shaped and are inclined downwardly toward their outer ends.

Said wheels are also flanged, as at 38, so as to prevent side slip. The axle for the steering-wheels is formed by a couple of arms or journals 39, Fig. 12, arranged to extend laterally and incline downwardly from a centrally-arranged hub 40, which is rigidly secured to a vertical stem or spindle 41. The vertical spindle 41, which is thus rigid with the axle of the steering-wheels, is arranged to turn about its axis, so that the steering-wheels can turn to the right or left, as occasion may require. The spindle 41 is inclosed by a vertically-arranged tubular case 42, which is provided with bearings 43 for the spindle, and which is made rigid with the main frame, a simple and convenient way of thus holding the said tubular bearing being to provide it with lugs or projections 44, Fig. 13, which are bolted to a forward extension of the coal-box or bearings thereon, it being observed that in this connection the coal-box forms a portion of the main frame, since it is rigidly secured to the same, and that the forwardly-converging sides of the coal-box meet at the front end of the machine.

The steering mechanism, which is subject to the control of an attendant standing in front of the boiler-furnace, comprises a horizontally-arranged vibratory rack or gear segment H, which is arranged for operation in rear of the steering-wheels and connected with the ends of the axle for said wheels by a couple of arms or rods 45, which converge forwardly from the rack-segment, respectively, at opposite sides of the pair of steering-wheels. Connection is also made between the middle of said rack-segment and the middle of the axle for the steering-wheels, and to such end the hub 40, which is midway of the ends of the axle, is provided with a rearwardly-extending arm 46, Fig. 13, which is at its rear end attached to the rack-segment at a point between the ends of the latter.

While the rods 45 could be made to serve as the sole connection between the rack-segment and the axle, I prefer to employ the arm 46 as an auxiliary connection between the two, since by such means the axle is more firmly braced from the rear and an extremely strong and durable connection established between the rack-segment and the axle. The vibratory rack-segment H is operated from a vertically-arranged spindle 47, and to such end said spindle is provided with a pinion 48, which engages the rack-segment. The rotary spindle 47, which carries at its lower end the pinion 48, extends upwardly through a tubular bearing 40, that is rigid with the main frame or coal-box, and at its upper end said spindle is provided with a worm-wheel 50, which is fixed upon the spindle and operated by a worm-shaft 51.

The worm-shaft 51 is conveniently mounted in bearings on a forward part of the main frame, that is herein formed by forwardly-converging extensions of the coal-box. The worm-shaft can be driven in either direction from a jointed power-transmitting shaft 52, which extends back from the forward portion of the machine and is gear-connected with one of the bevel-gears on the rotary engine-shaft 25. As a means for establishing connection between the jointed power-transmitting shaft and the worm-shaft and for reversing the movements of the latter, so as to steer to the right or the left, as required, the worm-wheel shaft is provided at one end with a large bevel friction-wheel 53, which can be engaged by either one of two oppositely-arranged small bevel friction-wheels 54 and 55 on the power-shaft 52. The small friction-wheels are rigid upon the power-shaft, which during the travel of the machine is driven continuously from the engine, in which way when one or the other of the small friction-wheels is thrown into frictional contact with the friction-wheel on the worm-shaft the latter will be turned in a direction dependent upon which one of the small friction-wheels is in engagement with the larger friction-wheel on the worm-shaft. As a means for simultaneously shifting the friction-wheels 54 and 55 so that either of them can be thrown into contact with the friction-wheel 53, or both so positioned as to be altogether out of contact therewith, the forward end portion of the jointed power-shaft 52 is arranged to both revolve and shift endwise in bearings 56, Fig. 14, on the main frame, and at a point between the two small friction-wheels is a lever 57, which is so connected with the power-shaft as to permit a swing on the part of the lever to shift the shaft endwise, but at the same time permit it to rotate continuously. As a convenient way of straining such connection between the lever 57 and the power-shaft, the lever is fulcrumed between its ends and at its lower end pivoted to a sleeve 58, which is loose upon the power-shaft and arranged between a couple of shoulders or collars 59, that are rigid with the shaft, so that while the sleeve is held against end slip independent of the shaft the latter can turn freely in the sleeve. In order to permit an engineer standing upon the main frame at a point in front of the boiler-furnace to operate the lever 57, the latter is placed subject to the movement of a steering lever or handle 60, Figs. 1 and 2, which is arranged within convenient reach of the engineer. As a connection between the steering-handle 60 and the lever 57, the two arms of the lever 57 are respectively connected by rods, chains, or cords 61 and 62 with one and the other of a couple of vibratory arms 62ª. Said arms are rigid upon a horizontally-arranged spindle 63, which is gear-connected with a short spindle 64, to which the steering-handle 60 is attached. A bearing 65 for the spindle 63 is secured to an upright brace or standard 66, which rises from the main frame, which said standard also serves as a support for a bearing 67, that is provided for the steering-handle spindle 64. The said two spindles are provided with miter-gear segments 68 and 69, respectively, it being observed that the two spindles are conveniently arranged at right angles to one another.

The form and arrangement of the steering-wheels tend to keep them in position for direct forward progression, while by operating the steering-handle the engineer can at will render the steering-wheels subject to a steam-actuated steering mechanism, which by reason of its motive power will permit the machine to be readily turned on the roughest kind of ground.

The fulcrum for the lever 57 is adapted to swing to such extent as may be necessary in operating the lever to shift the power-shaft 52 endwise, and for such purpose the pivot for said lever is formed by a crank 70, which is supported to turn to a limited extent in a bearing 71 on the main frame.

In order to guard against liability of the steering-wheels being swung round by the steam-actuated steering mechanism too far to the right or to the left, means are provided for automatically interrupting connection between the power and the wheels the moment the wheels have been swung round in either direction to a determinate point. Said means comprise a couple of bent levers I and K, which are arranged to vibrate in horizontal planes and pivotally supported at their bends upon a common pivot 72. The pivot for these levers is arranged intermediate of the converging sides 73 of the coal-box or forward part of main frame, and can be formed upon a bracket 74, which can be supported from the main frame in any suitable way. The bent levers I and K are arranged so that the forwardly-extending arm 75 of the lever I and the forwardly-extending arm 76 of the lever K constitute in conjunction a pair of jaws. In like manner the laterally-extending rear arm 77 of the lever I and the laterally-extending rear arm 78 of the lever K constitute in conjunction a pair of jaws. The spindle 41 for the steering-wheels is at its upper end provided with an oblong piece, which is rigid with said spindle and adapted to provide a couple of arms 79 and 80, which extend, respectively, forwardly and rearwardly from the spindle. The arm 79 is the longer of the two arms 79 and 80, and said two arms, which are formed in line with one another, are arranged between the jaws 75 and 76. When the steering-wheels are running directly ahead, the arms 79 and 80 will lie in line coincident with the direct line of progression, and under such conditions the jaws 77 and 78 will lie apart or open, as in Fig. 13. The upper arm of the lever 57 extends upwardly between the jaws 77 and 78 and is normally out of contact with the same.

When the steering-wheels are swung round for the purpose of turning the machine, the partial rotation of the spindle 41 will necessarily swing the arms 79 and 80 in a direction to cause them to act upon and spread apart the jaws 75 and 76. The spreading apart of the jaws 75 and 76 will cause a simultaneous closing action on the part of the jaws 77 and 78, and thereby cause one or the other of them to set upon the lever 57 (according to the inclination which the lever has been caused to assume by the act of the engineer in steering) and to force said lever to such position as will place the small friction-wheels 54 and 55 out of contact with the friction-wheel 53. When the jaws 77 and 78 are open, as in Fig. 13, and the lever 57 is in position to hold the small friction-wheels out of contact with the large friction-wheel, the upper arm of the lever will be midway between the jaws. The movement of the lever to cause the steering-wheels to swing either way will swing the lever toward one of the jaws 77 and 78; but the instant the wheels have swung to a determinate extent the closing action of the jaws 77 and 78 incident to such swing will reach a point where further swing on the part of the wheels will cause one of the jaws to engage and swing the lever 57 into an upright position and thereby relieve the friction-wheel 53 from such one of the small friction-wheels as may have been in contact therewith. The power will thereby be automatically taken off from the steering mechanism in time to avoid too great an extent of swing on the part of the steering-wheels.

In order to prevent the teeth of the rack-segment H from jamming back into the pinion 48, the rack-segment is provided with a flange 81, which extends to some extent over the rack-segment teeth, and the pinion 48 is provided with a similarly-formed circular flange 82, arranged in the horizontal plane of the flange of the rack-segment. These two oppositely-arranged flanges abut against one another, so that while the edge of the flange or shoulder 82 of the pinion may in effect roll along the edge of the flange or shoulder 81 of the rack-segment when the latter is vibrated said flanges will act as stops, which prevent the teeth of the rack-segment from being forced too deep into the pinion.

The side bars A of the main frame extend to the rear of the traction-propelling device, so as to provide means for supporting the plow lifting and steering mechanisms and to permit the plows I to be so connected with the main frame of the machine that they may be drawn therefrom.

The plows are positioned at intervals along a line oblique to the line of progression and are preferably coupled in pairs, so that each plow-beam K may serve for a pair of plows. Yokes 83 are attached to the rear portions 84 of the beams, and the plows are attached to said yokes, it being observed that each yoke has one arm made longer than the other, so as to permit one plow of each pair to set farther back than its companion. Each plow-beam is jointed, as at 85, the pivots or pintles of said joints being arranged horizontally and transversely to the plow-beams, so that the plows may be raised and lowered. The plow-beams are at their forward ends attached by joints 86 to a diagonally-arranged draft-bar L, which is so connected with the main frame of the machine that the plow-beams with their allotted plows may be drawn therefrom, it being observed that the rods or links herein shown as connections between the joints 85 and 86 may be regarded as portions of the plow-beams. The obliquely-arranged draft or pulling bar L is made in two sections, Figs. 6 and 21, one of said sections being made considerably longer than the other. The shorter section 87 of the sectional draft-bar L is rigidly secured to the main frame and can be braced in any suitable way, as indicated by the brace-rod 88, which is shown attached to one of the side bars of the main frame and extended out therefrom, so as to connect with the outer end portion of the rigid section 87 of the draft-bar. The longer section 89 of the draft-bar is at its rear end pivotally attached to the forward end of the short draft-bar section 87 by a vertical pivot, as at 90, so that while the short section 87 of the draft-bar is held immovable the longer section 89 may swing horizontally. While two or more of the pairs of plows are drawn from the draft-bar section 87, (three pairs of plows being herein shown therewith,) the remaining plows, which constitute a majority of the entire series, are drawn from the swinging draft-bar section 89. As a means for effecting a swinging adjustment on the part of the movable draft-bar section 89, it is connected by a link 91, Figs. 16, 20, and 21, with an arm 92, which is fixed upon the short vertical spindle of a vibratory segment-gear 93, as illustrated in dotted lines in said Fig. 21 and further illustrated in said Figs. 16 and 20. The spindle for the segment-gear 93 extends through a vertically-arranged bearing 94, Fig. 20, formed with or secured to a horizontal bracket 95, which said bracket can be secured to the main frame of the machine in any suitable way—as, for example, it can be secured to one of the channel-iron side bars A. The segment-gear 93 engages a pinion 96 (also shown in dotted lines in Figs. 16 and 21) on the lower end of an upright spindle, which extends up through a stationary bearing 97, and which is provided on its upper end with a worm-wheel 98. The worm-wheel 98 is engaged by and operated by a horizontally-arranged worm-shaft 99, which is supported upon bearings on the bracket 95 and provided at one end with a conical or beveled friction-wheel 100. Said friction-wheel 100 can be engaged by one or the other of a couple of small conical friction wheels or rolls 101, which are arranged upon and carried by shaft 102. The small friction-rolls 101 can of course be arranged to revolve with and slide upon the rotary shaft 102; but as preferred means they are rigid upon said shaft and the shaft itself is capable of end movement, it being understood that said rolls can be arranged in the same way that the friction-rolls heretofore described in connection with the steering mechanism are arranged, and that a sleeve 103, Fig. 16, can be arranged loose upon the shaft 102 and confined between two shoulders 104 on said shaft in the manner hereinbefore described in connection with the friction-rolls 54 and 55. As a means for adjusting the shaft 102 endwise, so as to place either of the two friction-rolls 101 in frictional contact with the beveled friction-wheel 100 or to set both of said friction-rolls altogether out of contact with said friction-wheel, an arm 105 is secured upon one end of a rock-shaft 106 and pivoted at 107 to the sleeve 103. Said rock-shaft 106 is provided at the opposite end with a hand-lever 107, which can be operated by an attendant standing upon the platform M.

By the foregoing arrangement the attendant can operate the hand-lever 107 so as to place either friction-roll 101 in contact with the friction-wheel 100, according to the direction in which it is desired the draft-bar section 89 shall be swung, it being understood that when the friction-wheel 100 is driven from either of the two friction-wheels 101 it will in turn cause the operation of the segment-gear 93 through the medium of gears 98 and 96, and that said segment-gear will, through the medium of its arm 92 and the link or connecting-rod 91, swing the draft-bar section 89. It is also understood that during the travel of the machine the shaft 102 will be driven continuously from the engine, so as to be ready at any time for service.

Should at any time during operation the first plow be started wrong, the fault can be corrected and the plows lined up by the aforesaid adjustment of the draft-bar section 89, it being understood that the adjustment of the said draft-bar section will cause the fault to be evened up throughout the entire series of plows, since all of the plows will naturally fall into proper lines from the first to the last of the series.

As a means for driving the rotary shaft 102 continuously from the engine, it is provided at one end with a cog 108, which is engaged by a driving-cog 109 on the rotary power-shaft N, which said shaft is suitably jointed and extended forward to the engine, whereat it is engaged by one of the bevel-gears with which the rotary engine-shaft 25 is provided, as best illustrated in Fig. 3. The shaft 102 is arranged to both slide and revolve in bearings 110 on the main frame, and the driving-cog 109, which is secured upon the power-shaft N, is made somewhat longer than the cog 108, whereby engagement between the two can be maintained regardless of the end shift of the shaft 102.

The plows can be raised by means of power derived from the power-shaft N, and to the attainment of such end I provide upon the platform M a winding device, by which a chain or cable connected by suitably-arranged branches with the plows can be wound and unwound, so as to raise and lower the plows. The winding device comprises a winding-drum 111, whereon a chain or cable 112 can be wound. Said cable is arranged to pass about the pulleys 113 and 114, arranged as a block and tackle, from which cords or cables 115 and 116 lead off to the several plows, it being observed that said cables or suitable branches therefrom pass about and are guided by the pulleys 117, 118, and 119, which are supported upon an elevated diagonally-disposed cross-bar P. The pulleys 117 are arranged upon vertical pivots which rise from the bar P, while the pulleys 118 and 119 are conveniently arranged upon horizontal pivots held upon standards 120, that are secured upon the bar P. The axle of the winding-drum 111 is journaled in bearings 121 upon the platform M and is provided with a worm gear-wheel 122, which engages a vertically-arranged worm-shaft 123. Said worm-shaft is mounted in brackets 124 and 125 on one of the standards of the main frame and is at its lower end provided with a beveled friction-wheel 127, which said beveled friction-wheel can be engaged by either one of a couple of small conical friction-rolls 128. The small conical friction-rolls 128 are secured upon a rotary shaft 129, which is arranged alongside of one of the side bars A of the main frame and mounted in bearings which are attached to said frame, as best shown in Fig. 17. The rotary shaft 129 is also capable of sliding endwise in its bearings, so as to permit the conical friction-rolls 128 to be alternately thrown into gear with the friction-wheel 127 or to be both placed out of connection with said wheel. The shaft 129 is driven from the long gear 109 of the power-shaft M, and to such end the shaft 129 is at one end provided with a short gear 130, which meshes with the longer gear 109. The shaft 129 can be shifted by an attendant standing on the platform M, and to such end it is engaged by an arm 131, which is secured upon one end of a horizontally-arranged rock-shaft 132. Said rock-shaft 132 is at its opposite end provided with a hand-lever 133, which extends above the platform M not far off from the hand-lever 107, in which way the attendant may conveniently operate either of said two levers. The arm 131 of the rock-shaft 132 is at its lower end forked, so as to embrace the shaft 129, and said forked end of the lever is arranged between a couple of shoulders 134 on the rotary shaft, as will be well understood without further illustration.

For convenience of illustration I have herein generally represented the hand-levers 107 and 133 as provided with ordinary spring-latches arranged for engagement with notched segments. In Figs. 18 and 19 I have provided means for normally maintaining said levers upright or at a position intermediate of the extremes of throw. In said figures the lever is provided with a spring-slide 134, which is arranged to slide longitudinally upon the lever. The spring 136 is arranged about a portion of the slide and confined between a bearing 137 on the lever and a nut or shoulder upon the upper end of the slide. The slide works through the bearings 137, so that when the slide is drawn down the spring will be compressed between the bearing 137 and the nut which is fixed upon the upper end of the slide. The slide is so connected with the main frame of the machine that when the lever is swung either way from its middle or upright position the spring will be compressed and therefore act to restore the lever to its upright position as soon as the operator may release the same. To such end a couple of downwardly-diverging rods or links 138 are at their upper ends pivotally connected with the slide and at their lower ends arranged to slide through rocking bearings 138$^a$. The links are provided with stops 138$^b$ below said rocking bearings, and the latter are pivoted upon a bracket or support on the main frame. When, for example, the lever is swung to one side, as indicated in dotted lines in Fig. 18, one link will slide through its allotted rocking bearing, while the other link will so hold the slide that the spring will be compressed, it being observed that the compression of the spring will necessarily take place, since the lever swings about a center which is eccentric to the said rocking bearing. One or both of the hand-levers 107 and 133 can be provided with the device illustrated in said Figs. 18 and 19.

The bar P is arranged obliquely to the length of the machine in conformity with the obliquely-arranged series of plows and can be supported from the main frame by suitable standards, it being noted that I prefer forming the standards by which the elevated bar P and the elevated platform M are supported from the main frame of channel-iron, the whole being braced in any convenient way, so that the said bar and platform may for the general purpose of my invention be considered as a part of the main frame of the machine. During the plowing operation it may happen that one of the plows will meet with an impassable obstruction—such as a stump or stone—and to avoid breakage of the machine the plows are so connected with the machine that upon the event of any one or more of the plows encountering such impassable obstruction it will be automatically detached from the machine.

Referring more particularly to Figs. 22 to 25, both inclusive, the plow-beam joint 85 is formed by a couple of plates 139, which have their forward ends spread apart and widened, as in Fig. 22. The widened ends of said plates are each provided with a set of perforations 140 for a pivot-bolt 141, with which a rod that may be said to form the forward section of the beam is connected. The pivot can be adjusted along the sets of perforations 140 as may be found necessary, the arrangement of the said forward ends of the plates being in the nature of a clevis. The plates 139 fit, respectively, against opposite sides of the forward end portion of the rear main section 84 of the plow-beam and are clamped between a couple of plates 142. The inner faces of the plates 142 and the outer faces of the plates 139 are serrated or channeled longitudinally, so as to prevent lateral slip and provide an increased area of frictional surface between their engaging faces. The plates 142 have inclined or wedge-shaped outer faces, which are held between corresponding inclined inner faces of a surrounding collar 143, which is provided with a couple of rearwardly-extending arms or rod portions 144. At a point just back of the plates 139 and 142 the beam is provided with a couple of plates R, which are bolted to opposite sides of the beam and each provided at its forward end with a laterally-deflected end portion or lug 145. The rods or arms 144 of the wedge-collar 143 are extended through holes in the lugs 145 and carry springs 146, which are arranged between the lugs 145 and nuts 147, which are applied to the rear ends of the arms 144. The rear ends of plates 139 and 142 abut against the forward ends of plates R, and the lugs 145 are engaged by the plates 142, which at their rear ends are provided with openings 142ª, in which said lugs are received, the normal arrangement of all of said parts being best shown in Fig. 22. The springs 146 serve to draw back the collar 143 and cause the same to wedge upon the wedge-plates 142, which latter clamp the plates 139 against opposite sides of the beam. Should, however, the resistance to the advancement of the plow be greater than the holding-power of the plates 139, (which bind upon and hold the beam against end slip by frictional contact,) the plates 139 will be drawn from between the beam and the plates 142, and thereby leave the plow and its main beam-section.

In Figs. 5 and 6 I have represented a seed-sowing apparatus applied to the machine. The case S may contain or consist of any suitable hopper from which seed or fertilizing material can be conducted through a spout 148. The spout 148 discharges into a pipe 149, which is arranged obliquely to the length of the machine and provided with a set of laterally-arranged branch pipes or spouts 150. The branch spouts 150 take the seed or fertilizing material from the pipe 149 and discharge the same into a long seeding trough or hopper T, which is provided with a set of discharge-spouts 151. The seeding-trough T will in practice be provided with any ordinary or suitable seeding devices—such as force-feed devices or the like—it being regarded as unnecessary to herein particularly represent such feed devices. It is, however, understood that the feed devices, which are multiplied in accordance with the number of spouts 151, can be and herein are simultaneously operated by a rotary shaft 152, which can be driven from the engine by any suitable arrangement of geared shafting or link belting, the geared shafting herein shown for such purpose being divided into the shaft-sections 153 and 154.

The seed reservoir or hopper S is elevated to a suitable height and supported upon standards on the main frame. The boiler-furnace is braced by truss or brace rods or bars 156 and 157, Figs. 1, 3, and 5, which respectively extend from the boiler to the seed-receptacle S and from the boiler to the forward end of the machine, in which way the entire length of the main frame of the machine will be suitably stiffened.

The boiler-furnace B is made comparatively narrow from front to rear, and hence is wider from side to side, in which way it can be economically disposed upon the machine. The boiler-furnace is at its front provided with a convenient arrangement of doors 158 and 159, so that the engineer while standing in position to steer may also attend to the boiler-furnace. The boiler-furnace can of course be provided with other doors—as, for example, it may have one or more doors at one or both of its sides. The boiler-furnace is secured upon the channel-iron side bars A of the main frame and is constructed with a grate 160, fire-chamber 161, and two sets of flues 162, which lead from the fire-chamber through the boiler 163 and into a centrally-arranged chamber 164, from which said chamber the main flue-pipe 165 extends upwardly through the dome 166.

In Fig. 6 I have illustrated a set of harrows V, which are connected with the plows by suitable connections and arranged to drop back of the seeding devices to a proper distance.

It is understood that various features of the machine render it adapted for drawing other devices than plows, and also that I may adapt the machine for service as a grader and ditcher by providing a different arrangement of plows.

What I claim as my invention is—

1. The combination, substantially as hereinbefore set forth, with the main frame, a gang of plows, and a steam-actuated traction-propelling device, of one or more steering-wheels arranged upon a swinging axle, a friction-wheel gear connected with a vibratory rack-segment which is connected with the swinging axle, a power-shaft which is driven from the engine, and a couple of friction rolls or wheels held upon the power-shaft and arranged for alternately engaging the friction-wheel that is gear-connected with the vibratory segment.

2. The combination, substantially as hereinbefore set forth, of one or more steering-wheels arranged upon a swinging axle at the forward end of the machine, a vibratory rack-segment connected with the swinging axle, the worm-shaft 51, provided with a friction-wheel 53, the spindle 47, provided with a worm gear-wheel 50 and a pinion 48, the former engaging the worm-shaft and the latter engaging the vibratory rack-segment, a steam-power shaft provided with the small friction-wheels 54 and 55, and a lever for shifting the power-shaft so as to place either of the two small friction-wheels in engagement with the friction-wheel 53.

3. The combination of the steering-wheels arranged upon a swinging axle at the forward end of the machine, the vibratory rack-segment connected with the axle by links 45, and a middle arm 46, and gearing for operating the vibratory rack-segment, substantially as and for the purpose set forth.

4. The combination, with one or more steering-wheels and a swinging axle therefor, of the lever for establishing connection between a steering mechanism and a steam-power-driven shaft, the two pairs of synchronously-operating jaws, and arms 79 and 80, arranged between one of said pairs of jaws and fixed upon a spindle which is rigid with the swinging axle, said lever being extended between the remaining pair of jaws, substantially as and for the purpose set forth.

5. The combination of the steering-wheels D, arranged upon a swinging axle, the vibratory rack-segment connected with the swinging axle, the friction-wheel 53, gear-connected with the vibratory segment, and the rotary and longitudinally-movable power-shaft 52, provided with friction-wheels 54 and 55, arranged for alternate engagement with the friction-wheel 53, substantially as and for the purpose described.

6. The combination, with a steam-actuated steering mechanism provided with a reversing-lever 57, of the vibratory lever 62$^a$, substantially as and for the purpose set forth.

7. The combination and arrangement of the vibratory lever 62$^a$, connected, as set forth, with the reversing-lever, a steam-actuated steering mechanism for the purpose of controlling the same, and a spindle 63, carrying said lever 62$^a$ and gear-connected with a short spindle 64, which is provided with a handle, substantially as described.

8. The main frame supported at its forward end by a steering-wheel and at a point in rear thereof carrying a boiler-furnace, a traction-propelling device carrying the engine and having its truck jointed to the main frame in rear of the point whereat the boiler-furnace is supported on the main frame, and a truss 157, extending upwardly and rearwardly from the forward end portion of the main frame and connected with the boiler-furnace, said members being organized and arranged substantially as set forth.

9. The combination of the main frame, the rocking engine-truck arranged between the sides of the main frame in front of the engine-truck, a steering mechanism at the forward end of the main frame, and a jointed power-transmitting shaft arranged to connect an engine upon the rocking engine-truck with the steering mechanism, said members being organized substantially as and for the purposes set forth.

10. The combination, with the wheeled engine-truck and endless slatted track for the engine-truck wheels to roll upon, of a wheel arranged for driving one of the engine-truck wheels and spring-connections between the said two wheels, substantially as set forth.

11. The combination, with the wheeled engine-truck and endless slatted track for the engine-truck wheels to roll upon, of the spur-wheel 12 and yielding connections between the spur-wheel and one of the engine-truck wheels, comprising the bolts 13 and springs 14, substantially as and for the purpose described.

12. The combination, with the engine-truck and endless slatted track for its wheels to roll upon, of the rotary engine-shaft, two sets of gearing connecting the rotary engine-shaft with two of the engine-truck wheels and respectively involving the differently-sized gears 27 and 28, and a clutch device for placing said gears alternately in connection with the portions of the gearing which intervene between the same and the said two engine-truck wheels, substantially as and for the purpose described.

13. The combination, with the engine-truck and the endless slatted track for its wheels to roll upon, of the spur-wheels 12, connected with a couple of the engine-truck wheels, the gears 27 and 28, loose upon a rotary shaft 23, gearing connecting said shaft with the spur-wheels, a double-clutch device for placing the wheels 27 and 28 alternately in rigid connection with the shaft 23, and the double-cranked rotary engine-shaft 25, gear-connected with the gears 27 and 28, substantially as described.

14. The combination, with a main frame and a traction device comprising an engine-truck and an endless slatted track for its wheels to roll upon, of a gang of plows connected with the main frame by jointed connections, a winding-drum, a chain or cable connected with the plows and arranged to wind upon said drum, a friction-wheel 127, gear-connected with the winding-drum, and a rotary shaft provided with a couple of friction-wheels arranged for alternate engagement with the friction-wheel 127, substantially as set forth.

15. The combination, with the plows, of a lifting mechanism comprising a winding-drum and cable, gearing for operating the winding-drum, a rotary and longitudinally-adjustable shaft 129, by which the said gearing can be connected with or disconnected from the source of power, a lever 133, secured upon a rock-shaft, and an arm 131, secured upon said rock-shaft and arranged to engage the shaft 129, substantially as and for the purpose described.

16. The combination, with the main frame, of the elevated bar P, supported upon the main frame and arranged obliquely to the length of the machine, standards 120 on the bar P, a winding-drum and a cable leading therefrom and connected with a set of vertically-swinging plows, and pulleys for branch cables arranged upon the standards 120, substantially as described.

17. The combination, with the main frame and a set of plows connected therewith, of the elevated platform M, a winding-drum arranged upon said platform, a cable leading from the winding-drum, a bar P and pulleys supported thereon, and branch cables passing about said pulleys and connecting the main cable with the plows.

18. The combination, substantially as hereinbefore set forth, with a steam-actuated tractor, of a gang of plows drawn thereby and having their beams provided with separable friction-joints, each comprising an end portion of the plow-beam held by a clamp which holds the beam by frictional contact sufficient to draw the plow during all ordinary work, but to allow the beam to slip from the clamp should the plow meet with a positive resistance during the operation of plowing, and thereby allow the plow to become disconnected from the machine.

19. The combination, substantially as hereinbefore set forth, with a steam-actuated tractor, of a gang of plows hinge-connected with the tractor, so that they can be raised and lowered, a raising and lowering mechanism for raising and lowering the plows, rotary power-transmitting shafting for transmitting driving-power from the tractor-engine to the plow raising and lowering mechanism, and a raising device for shifting connection between said rotary power-transmitting shafting and the plow raising and lowering device, so as to permit the plows to be either raised or lowered.

20. The combination, with the plows, of a winding-drum connected with the plows by chains or cables, a beveled friction-wheel connected by suitable gearing with the winding-drum, and friction-rolls 128, carried by a rotary shaft which is movable endwise and arranged for placing the friction-rolls 128 alternately in engagement with the beveled friction-wheel, substantially as and for the purpose set forth.

21. The combination, with the plows, of the beams therefor, each provided with a separable friction-joint comprising the plates 139, 142, and R, and the collar 143, provided with arm 144 and springs 146 thereon, as and for the purpose set forth.

22. The combination, with a hopper S, of a spout 148 leading therefrom, a distributing-pipe 149, communicating with said spout, and a plurality of branch pipes leading from said distributing-pipe to a seeding-trough, substantially as described.

23. In a tractor, an engine carried by said tractor for driving the latter, a seeding apparatus mounted upon said tractor, and a jointed rotary shaft geared with said engine and with said seeding apparatus for operating the latter, substantially as described.

SEVERIN C. A. HOLTH.

Witnesses:
CHAS. G. PAGE,
ANNIE COATES.